United States Patent [19]

Cohen et al.

[11] Patent Number: 4,595,498

[45] Date of Patent: Jun. 17, 1986

[54] WATER-POLISHING LOOP

[75] Inventors: Judith S. Cohen, Dallas; Joel W. Browning, Flower Mound; Wilford H. Gopffarth, Fort Worth, all of Tex.

[73] Assignee: Thomson Components-Mostek Corporation, Carrollton, Tex.

[21] Appl. No.: 686,861

[22] Filed: Dec. 27, 1984

[51] Int. Cl.⁴ .................. B01D 13/00; B01D 15/04
[52] U.S. Cl. ............................ 210/192; 210/195.1; 210/195.2; 210/196; 210/202; 210/257.2; 210/258
[58] Field of Search .................. 210/257.2–259, 210/295, 668, 900, 192, 194, 195.2, 197, 638, 760, 764, 748, 195.1, 188, 196, 202; 422/199, 205; 250/430, 436, 438, 527

[56] References Cited

U.S. PATENT DOCUMENTS

| | | | |
|---|---|---|---|
| 3,550,782 | 12/1970 | Veloz | 210/257.2 |
| 4,000,065 | 12/1976 | Ladha et al. | 210/321.1 |
| 4,156,652 | 5/1979 | Wiest | 210/760 |
| 4,160,727 | 7/1979 | Harris, Jr. | 210/257.2 |
| 4,273,660 | 6/1981 | Beitzel | 210/760 |
| 4,274,970 | 6/1981 | Beitzel | 210/760 |
| 4,280,912 | 7/1981 | Berry, III et al. | 210/900 |
| 4,332,685 | 6/1982 | Nowlin et al. | 210/257.2 |

FOREIGN PATENT DOCUMENTS 2414480 9/1979 France .................. 210/192

Primary Examiner—Benoit Castel

[57] ABSTRACT

A water purification system includes an ion-exchange unit for producing high-resistivity water, followed by ozone exposure and ultraviolet sterilizer units that oxidize organics and also reduce resistivity, followed by a vacuum degassification unit to restore high resistivity.

5 Claims, 3 Drawing Figures

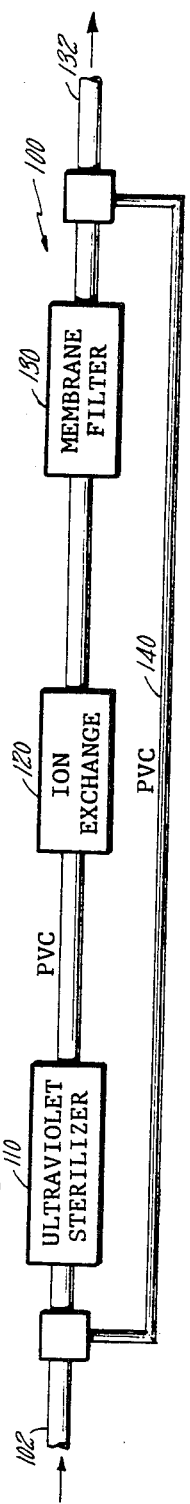
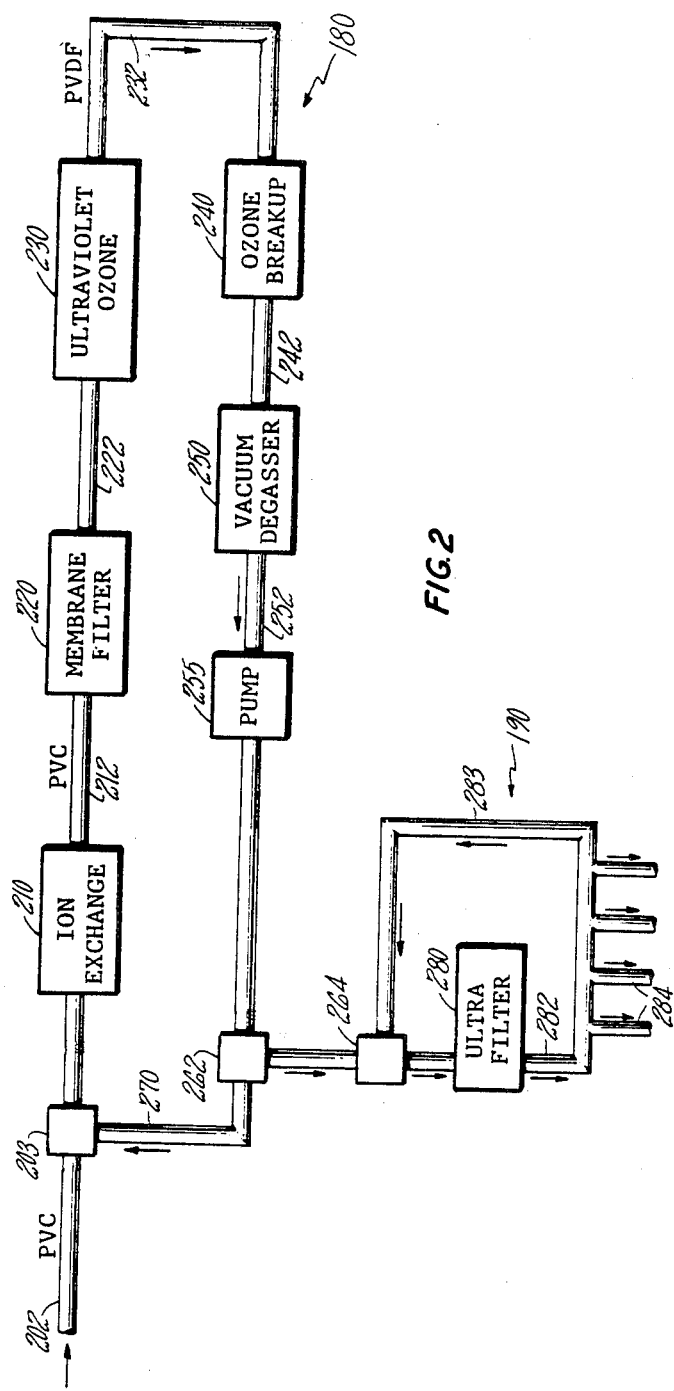

WATER-POLISHING LOOP

TECHNICAL FIELD

The field of the invention is that of water treatment in integrated circuit processing. In particular, the field is that of a water-polishing loop in the final stage of a water treatment system.

BACKGROUND ART

The water used in the production of integrated circuits must be deionized and purified as much as possible in order to avoid contamination of the integrated circuits during processing. Conventional water treatment systems employ a central purifying plant that employs a combination of depth filtration, carbon filtration, reverse osmosis, ultraviolet sterilization, ion exchange, and membrane filtration. The purified water from the central plant is pumped to the several fabrication lines and circulated through standard polishing loops immediately prior to use. These standard loops in the prior art, such as that disclosed in "Ultrapure Water in Semiconductor Manufacturing", by R. Taubenest and H. Ubersax, appearing in Solid State Technology, June, 1980, employ a series of ultraviolet sterilization, ion exchange, and membrane filtration operations, in that order; which kill bacteria, increase the resistivity of the water, and remove particles, respectively. The standard piping material in the prior art is polyvinyl chloride (PVC). This material has the disadvantage that it leaches organic matter and particles into the purified water. The ion exchange apparatus also contaminates the water by the leaching of organic material and particles.

U.S. Pat. No. 4,280,912 teaches the use of a process in which the first and last steps of the process employ resins that have improved ability to remove organic matter. These resins are themselves sources of organic matter.

SUMMARY OF THE INVENTION

The invention relates to an improved water-polishing loop employing an ion exchange step followed by an oxidizing system, ultraviolet light treatment, vacuum degassification and membrane filtration.

A feature of the invention is the utilization of vacuum degassification to regain high resistivity.

A feature of the invention is a sequence of organic-removal steps following an ion-exchange step.

A feature of the invention is that of a step of combined ultraviolet light and ozone exposure.

A feature of the invention is the combination of two consecutive stages of ultraviolet light exposure for different purposes.

Another feature of the invention is the ability of the entire water-polishing loop to be sterilized with ozone.

BRIEF DESCRIPTION OF DRAWINGS

FIG. 1 illustrates a water-polishing loop in the prior art.

FIG. 2 illustrates an embodiment of the invention.

BEST MODE OF CARRYING OUT THE INVENTION

Figure 3:
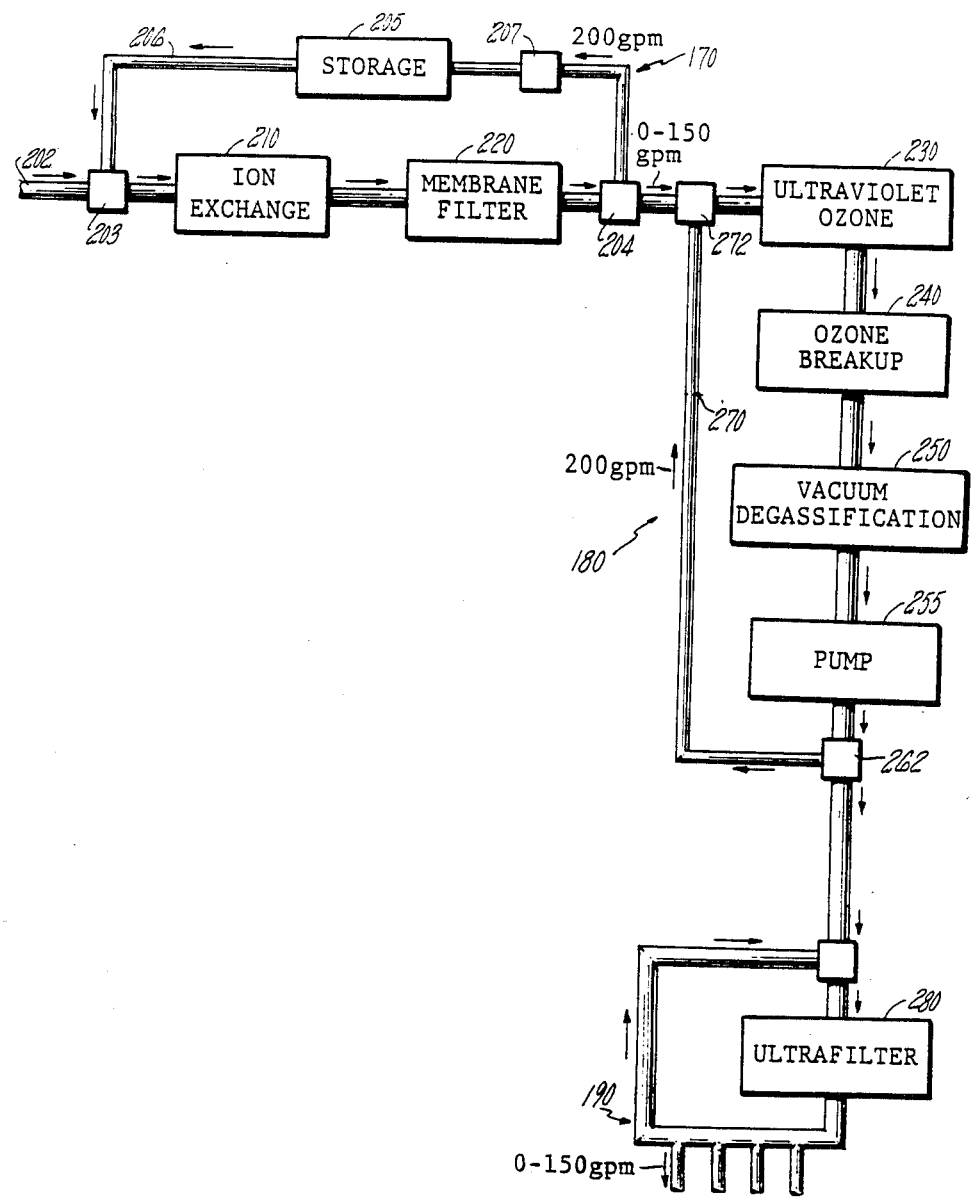
FIG. 3 illustrates an alternative embodiment of the invention.

The improvement of the invention over the prior art can be explained conveniently with reference to FIG. 1, showing a prior art water-polishing loop. In FIG. 1, input pipe 102 comes from a conventional central purifying plant, entering loop 100. The first step in the loop is an ultraviolet light sterilization apparatus 110 which exposes the water to ultraviolet light in order to kill bacteria. The second step is ion exchange apparatus 120, which exchanges ions in the water for $H^+$ and $OH^-$ ions, which combine to form pure $H_2O$, thus increasing the resistivity of the purified water. A drawback of any ion exchange device is that the resins used in these devices can contaminate the water with particles and organic molecules at the same time that inorganic ions are removed. The last step in the conventional loop is membrane filter 130 which filters particulate matter above some size that is determined by the filters. Return pipe 140 brings back a portion of the water to the input to ultraviolet sterilizer 110. The bulk of the water exits through outut pipe 132. The standard sequence in the prior art has been to place the ion-exchange unit late in the series of steps in order to have the maximum resistivity in the output water.

Referring now to FIG. 2, an embodiment of the invention is illustrated in which two water-polishing loops are connected in sequence. A main loop 180 handles most of purification steps and a final loop 190 adds a final filtration step. Input pipe 202, consisting of PVC (polyvinyl chloride), brings water from a conventional central purification plant through mixing valve 203, which combines the return water with the fresh input water, and enters ion exchange apparatus 210. Ion exchange apparatus 210 may be a commercially available unit such as Aqua Media Model P-200 as manufactured by Aqua Media, 1049 Kiel Court, Sunnyvale, Calif. 94086. The water passes through PVC pipe 212 to a membrane filter 220, another commercially available unit such as Millipore Model No. YY20 031 12 as manufactured by Millipore Corporation, P.O. Box F, 80 Ashby Road, Bedford, Mass. 01730. The water then passes through PVC pipe 222 to unit 230, a stainless steel ozone reactor, referred to herein as an ozone oxidation unit, that is ordinarily used in waste treatment, such as a Westgate Ozone Oxidizer as manufactured by Westgate research Corporation, 1031 Pontius Avenue West, Los Angeles, Calif. Unit 230, accepting a mixture of ozone and oxygen from a conventional ozone generator not shown in the figure, both exposes the water to ultraviolet light and mixes throughly ozone with the water in order to kill bacteria and also to oxidize the dead bacteria and any other organic matter present. The wavelength of the ultraviolet light employed may range from 180 to 300 nanometers. Preferably, bulbs having a high concentration of shorter wavelengths are placed in the upstream portion of unit 230, in order to generate some additional ozone from the incoming mixture of ozone and oxygen. The amount of additional ozone generated is not critical. Towards the downstream portion, bulbs having a higher proportion of longer wavelengths may be used. The longer wavelengths have a relatively greater germicidal effect than short ones and also tend to dissociate the residual unreacted ozone to molecular oxygen plus a single oxygen radical that is a powerful oxidizing agent. This unit having combined ozone and ultraviolet-light exposure will be referred to as an "ultraviolet-oxidation unit". It is not important whether all the light bulbs are in the same enclosure or in separate enclosures. The result of the oxidation step will be that all hydrocarbons are chemically changed to gases such as carbon dioxide or to water and the ozone is changed to oxygen. The output of unit 230 passes through pipe 232, illustratively either a stainless steel (such as 316 L SS) or polyvinylidene fluoride (PVDF) pipe, either of which has greatly improved inertness as compared with PVC pipe. The water passes next through optional ultraviolet sterilizer unit 240, a commercially available unit such as Aquafine Model CSL-12R as manufactured by Aquafine Corporation, 25230 West Avenue Stanford, Valencia, Calif. 91355. The wavelength of the ultraviolet light employed in this unit is concentrated in the far ultraviolet region of about 250 nanometers where the germicidal effect is greatest and also where there is a strong effect of the reduction of residual ozone to oxygen. The use of unit 240 will depend upon whether unit 230 produces satisfactory results in achieving the required degree of oxidation with a sufficiently small amount of residual ozone. This result will depend on the degree of organic contamination, among other factors, and this will vary from one installation to another. It is, of course, an additional expense and its use will depend on a cost/benefit tradeoff. All piping in the system after unit 230 is either PVDF or stainless steel. The water passes next through pipe 242 into vacuum degasser 250 which exposes the water to a reduced pressure for a period of time, thus permitting the gaseous oxidation products remaining from the ozone step and oxygen from the last ultraviolet light step to pass out of the water and be pumped away. Degasser 250 may be a commercially available unit consisting of a packed column, through which the water is allowed to fall, and a vacuum pump or other vacuum source. The packed column may consist of a pressure vessel constructed of stainless steel or high density polyethylene-lined carbon steel and contains packing media such as Tri-Packs as manufactured by Tri-Mer Corporation, 1400 Monroe Street, Owosso, Mich. 48867. The vacuum source may be a vacuum pump such as a Model MHC-80 as manufactured by The Nash Engineering Company, Norwalk, CT 06856. The water then passes through return pipe 270 back to valve 203. The valve 262 diverts the bulk of the circulating water to final loop 190. Valves 203 and 262 may be commercially available units such as the Masoneilan Camflex II as manufactured by Masoneilan Division, McGraw-Edison Company, 63 Nahatan Street, Norwood, Mass. 02062.

Loop 190 consists of ultrafilter 280, a commercially available unit containing ultrafiltration membranes having a pore diameter of less than one micron, such as Filmtec Model FT-50 as manufactured by FilmTec Corporation, 7200 Ohms Lane, Minneapolis, Minn. 55435. After the ultrafiltration step, the water passes through pipe 282 into a series of pipes 284 to the final stations where it is used. The remainder of the water recirculates through valve 264, similar to valve 203.

The quantity of water passing through the system will depend on the amount being used through pipes 284 of course. Illustratively, the net flow through a loop is 150 gallons per minute (gpm). In both loops 180 and 190 the return water flow is nominally one quarter of the input, so that 150 gpm enters pipe 202 and combines with 50 gpm from pipe 270 to have a circulating flow through loop 180 of 200 gpm. Similarly, 200 gpm pass through loop 190, consisting of 150 gpm from loop 180 with a recirculating value in pipe 283 of 50 gpm. In an illustrative embodiment, the water enters pipe 202 at a nominal pressure of 35 psi, dropping to 25 PSI in pipe 212 and then to a nominal 5 PSI in pipe 222. In the vacuum degassing stage 250, the pressure is necessarily reduced to less than atmospheric pressure and a pump stage 255 comprising one or more commercially available pumps such as the Ladish Series C Tri-Flo pump as manufactured by Ladish Co., Tri-Clover Division, Kenosha, Wisc. 53141, restores the pressure to a nominal value of 45 psi entering mixing valve 262. Ultrafilter 280 includes another pump to bring the pressure at output pipes 284 to a nominal value of 40 PSI. The actual values of pressure and flow rate will depend on the particular requirements of any application, of course. Those skilled in the art will readily be able to combine pump pressures, pipe sizes, number of units to operate in parallel in accordance with conventional practice. Pumps may be inserted in the apparatus wherever convenient.

An advantage of this invention is the ability to increase the flow of ozone while turning off the ultraviolet radiation and thus to flush the whole loop with ozone, killing any bacteria that may be present. It is well-known in the art that bacteria growth is a serious detriment in the production of electronic devices.

Those skilled in the art will readily be able to fashion alternative embodiments of the invention, such as that shown in FIG. 3, in which like elements are indicated by the same reference numerals as in FIG. 2. Here, there is an additional circulation loop 170 that includes ion exchange unit 210, membrane filter 220, a new diversion valve 204, storage tank 205 and PVC piping 206. In this embodiment, main loop 180 of FIG. 2 has been divided into loop 180 and loop 170. In normal operation, the bulk of the flow (150 gpm) passes directly through valves 204 and 272, with a relatively small fraction being recirculated in loop 170. When the net flow through the system is reduced sharply, such as during a shift change period, either valve 204 or optional controllable valve 207 opens to maintain flow through unit 210 reasonably constant, since it is a requirement of the type of ion exchanger used that the flow not fluctuate excessively. Valve 207 may be controlled manually, or by a conventional flowmeter inserted at any convenient location. If a different ion-removal technique were used, recirculation loop 170 could be dispensed with.

An advantage of the system of FIG. 3 is that the water passes through the ion exchanger less often than in FIG. 2. Once the water has been deionized, there will be a tradeoff point (depending on the purity of the incoming water, among other things) beyond which the particulates and organics leached out of the ion exchange unit outweigh the extra resistivity improvement provided by another pass. Since it is an object of this invention to produce improved water by removing the undesirable products of an ion exchange system, a configuration that minimizes recirculation through the ion exchanger has advantages that will outweigh the extra cost of loop 170, in some applications.

Considering the flow sequence through loops 170, 180 and 190, the resistivity of the water will be at a maximum in loop 170, but there will be an excess of organics in that loop. As the water passes through loop 180, the resistivity will drop, as a result of $CO_2$ and $O_2$ coming from the ozone oxidation process. The ultraviolet light in units 230 and 240 breaks up ozone leaving additional dissolved oxygen. Vacuum degasser 250 will remove most of the dissolved gasses, but in some applications the resistivity at valve 262 may be less than at valve 204, although the water is better for integrated circuit fabrication because there is less organic contamination. The prior art, accustomed to placing great weight on the resistivity as an indicator of quality, would not be led to place the ion exchange unit at the start of the process. The presence of a trace of dissolved $CO_2$ in the final output water is not necessarily a drawback because many operating steps in a clean room expose the water to $CO_2$ from the atmosphere and contaminate it also.

Within loop 190, the less recirculation the better, since there is nothing removed except particulates. In operation, the amount of water used will fluctuate considerably, so the recirculation cannot be tuned with precision.

We claim:

1. In a water-purification system, an improved water-polishing loop comprising:
    an inlet pipe for receiving previously purified water;
    an ultraviolet-light exposure unit;
    an ion-exchange unit;
    a first filter unit;
    an outlet pipe;
    a first recirculation pipe connected between said outlet pipe and said inlet pipe for recirculating highly purified water from said outlet pipe back to mix with said previously purified water, and thereby forming a first recirculation loop;
    means for flowing water through said ultra-violet light exposure unit, ion-exchange and first filter units; characterized in that:
    said ion exchange unit is followed by said first filter and ultraviolet-light exposure units;
    said ultraviolet exposure unit is preceded by an ozone oxidation unit;
    said ultraviolet exposure unit is followed by a vacuum degassification unit, whereby gaseous products of said ozone oxidation unit are removed; and
    a second recirculation loop connected to said outlet pipe and which second loop comprises an ultrafilter having an ultrafilter inlet and being connected between said outlet pipe and at least one feed outlet and a second recirculation pipe connected between said at least one feed outlet and said ultrafilter inlet.

2. The combination according to claim 1, further characterized in that:
    said ozone oxidation unit and said ultraviolet exposure unit combine to form a combined ultraviolet oxidation unit comprising means in which water containing oxygen is first exposed to ultraviolet light having short wavelengths adapted to form ozone and subsequently exposed to means for exposing said water to ultraviolet light having longer wavelengths adapted to dissociate ozone, whereby the germicidal effect of said ultraviolet light combines with the oxidation effect of ozone and further characterized in that the ultraviolet radiation in said ultraviolet oxidation unit acts to dissociate residual ozone as well as to sterilize.

3. The combination according to claim 2, further characterized in that said combined ultraviolet-oxidation unit is followed by an ultraviolet exposure means for further exposing water to ultraviolet light in a second wavelength region adapted to dissociate ozone.

4. In a water-purification system, an improved water polishing loop comprising:
    a first purification stage for further purifying water received from a preliminary stage comprising in fluid communication:
    an inlet pipe;
    an ion-exchange unit;
    a first filter unit following said ion-exchange unit;
    first recirculation means for recirculating a portion of water being purified through said ion-exchange unit;
    a second purification stage connected to said first recirculation means and comprising in fluid communication:
    an ozone oxidation unit comprising means for exposing said water to ozone;
    first ultraviolet irradiation means for exposing said water to ultraviolet light in a first wavelength region adapted to convert oxygen to ozone;
    degassification means following said first ultraviolet irradiation means for removing dissolved gases from said water;
    second recirculation means for recirculating a portion of said water back into said ozone oxidation unit; and
    a third purification stage connected to said second recirculation means and containing an ultrafilter and an outlet from said third purification stage.

5. The combination according to claim 4, further comprising a second ultraviolet irradiation means for exposing said water to ultraviolet light in a second wavelength region adapted to dissociate ozone.

* * * * *